(12) United States Patent
Singh et al.

(10) Patent No.: US 12,277,666 B2
(45) Date of Patent: Apr. 15, 2025

(54) SYSTEMS AND METHOD FOR SMOOTH SEGMENTATION

(71) Applicant: MAKO Surgical Corp., Weston, FL (US)

(72) Inventors: Sukhraj Singh, Mandi (IN); Nitish Puri, Delhi (IN); Michael Kohnen, Heitersheim (DE)

(73) Assignee: MAKO Surgical Corp., Weston, FL (US)

( * ) Notice: Subject to any disclaimer, the term of this patent is extended or adjusted under 35 U.S.C. 154(b) by 45 days.

(21) Appl. No.: 18/514,513

(22) Filed: Nov. 20, 2023

(65) Prior Publication Data
US 2024/0087273 A1    Mar. 14, 2024

Related U.S. Application Data

(63) Continuation of application No. 17/134,745, filed on Dec. 28, 2020, now Pat. No. 11,861,804.

(60) Provisional application No. 62/957,899, filed on Jan. 7, 2020.

(51) Int. Cl.
*G06T 19/20* (2011.01)
*G06T 17/20* (2006.01)

(52) U.S. Cl.
CPC .............. *G06T 19/20* (2013.01); *G06T 17/20* (2013.01); *G06T 2207/10081* (2013.01); *G06T 2219/2024* (2013.01)

(58) Field of Classification Search
CPC ........... G06T 19/20; G06T 17/20; G06T 2207/10081; G06T 2219/2024
USPC .......................................................... 382/275
See application file for complete search history.

(56) References Cited

U.S. PATENT DOCUMENTS

| | | |
|---|---|---|
| 8,010,180 B2 | 8/2011 | Quaid et al. |
| 2007/0109299 A1 | 5/2007 | Peterson |
| 2009/0190811 A1 | 7/2009 | Zheng et al. |
| 2022/0036653 A1 | 2/2022 | De Somere et al. |

FOREIGN PATENT DOCUMENTS

FR    2991092 A1 *  11/2013 ............... A41H 3/08

OTHER PUBLICATIONS

Cornel, Staircase-Aware Smoothing of Medical Surface Meshes, 2012, http://drivenbynostalgia.com/files/smoothing/index.html#overview.

(Continued)

*Primary Examiner* — Thomas J Lett
(74) *Attorney, Agent, or Firm* — FOLEY & LARDNER LLP

(57) ABSTRACT

A method of smoothing a surface mesh includes determining first angles between a first direction and vectors normal to a plurality of faces defined in the surface mesh, determining a set of artifact vertices by including a first vertex of the surface mesh in the set of artifact vertices responsive to the first angles associated with faces adjacent to the first vertex satisfying a first condition, calculating a weighted value for a second vertex of the surface mesh based on a distance from the second vertex to a nearest artifact vertex in the set of artifact vertices, and generating a smoothed surface mesh by using the weighted value in a smoothing algorithm applied to the surface mesh.

20 Claims, 8 Drawing Sheets

(56) References Cited

OTHER PUBLICATIONS

Moench et al., Staircase-Aware Smoothing of Medical Surface Meshes, Eurographics Workshop on Visual Computing for Biology and Medicine, 2010, 8 pages.

* cited by examiner

SYSTEMS AND METHOD FOR SMOOTH SEGMENTATION

CROSS-REFERENCE TO RELATED APPLICATION

This application is a continuation of U.S. patent Ser. No. 17/134,745, filed Dec. 28, 2020, which claims the benefit of and priority to U.S. Provisional Application No. 62/957,899, filed Jan. 7, 2020, the entire disclosures of which are incorporated by reference herein.

BACKGROUND

The present disclosure relates generally to the field of medical-imaging for use in assistive medical technologies, such as preoperative surgical visualization and planning, implant design, and computer-assisted surgical systems.

In assistive surgical technologies, it is useful to have an accurate computer model of a target organ or tissue, individualized to a specific patient for a given surgical operation. Using computer topography (CT) data, a surface mesh model can be created to visualize the surgical target anatomy in three dimensions. This model can then be used to plan surgeries, create and adjust custom implant designs, provide intraoperative navigation, and/or control robotic devices.

However, by result of discrete representation, specific artifacts, such as staircases or plateaus, are unintentionally generated in the model that can introduce surface error and visual distraction to the surgery staff, and, in some case, introduce a degree of error into control systems for robotic devices. Uniform smoothing algorithms have previously been used in an attempt to remove these artifacts; yet, uniform smoothing produces an undesirable reduction in total model volume, replacing one error for another. Additionally, uniform smoothing algorithms diminish small detail structures that otherwise should not have been removed. Improvements to smoothing for computer models used with navigated or robotically-assisted surgeries are therefore desired.

SUMMARY

Several embodiments of the present disclosure relate to a method comprising receiving an input surface mesh, the input surface mesh comprising a plurality of vertices; identifying a plurality of reference vectors; then for each of the plurality of reference vectors, identifying a set of artifact vertices from the plurality of vertices of input surface mesh by calculating normalized angles between the reference vector and a plurality of normal vectors, the plurality of normal vectors associated with a plurality of faces defined in the input surface mesh, and defining a vertex of the plurality of vertices of the input surface mesh as an artifact vertex if the normalized angles associated with a set of the faces adjacent the vertex are different by more than a threshold amount. The method also comprises aggregating the plurality of sets of artifact vertices associated with the plurality of reference vectors to define a master set of artifact vertices; calculating a weighted value for each vertex of the plurality of vertices in the input surface mesh, wherein the said weighted value is based on a normalized distance of the vertex to a nearest artifact vertex of the master set of artifact vertices; and applying a smoothing algorithm to the input surface mesh, wherein the weighted values are used to adjust the smoothing algorithm to obtain a smoothed output surface mesh.

In some embodiments, the plurality of reference vectors are defined by a plurality of coordinate vectors associated with the input surface mesh.

In some embodiments, the input surface mesh is generated using computer-tomography (CT) image data, and wherein the plurality of reference vectors are defined by at least the two coordinate vectors of CT image data and a stack direction of the CT image data used to generated the input surface mesh.

In some embodiments, the plurality of reference vectors includes at least three reference vectors.

In some embodiments, the normalized angles are calculated by performing a dot product of the reference vector and the plurality of normal vectors.

In some embodiments, the weighted value for each vertex of the plurality of vertices in the input surface mesh is computed by comparing the normalized distance to a threshold distance.

In some embodiments, the weighted value for each vertex is normalized on a quadratic scale.

In some embodiments, the method further comprises displaying a graphical representation of the smoothed output surface mesh on a display.

In some embodiments, the method further comprising controlling a robotic device based on the output surface mesh by defining a smooth haptic boundary based on the output surface mesh.

In some embodiments, the method comprising providing smooth haptic feedback via the robotic device based on an interaction between the smooth haptic boundary and an interaction point associated with a surgical tool of the robotic device.

Several embodiments of the present disclosure relate to a computing system comprising a processing circuit comprising a processor and memory, the memory structured to store instructions that are executable by the processor and cause the processor to receive an input surface mesh, the input surface mesh comprising a plurality of vertices; identify a plurality of reference vectors; then for each of the plurality of reference vectors, identify a set of artifact vertices from the plurality of vertices of input surface mesh by calculating normalized angles between the reference vector and a plurality of normal vectors, the plurality of normal vectors associated with a plurality of faces defined in the input surface mesh, and defining a vertex of the plurality of vertices of the input surface mesh as an artifact vertex if the normalized angles associated with a set of the faces adjacent the vertex are different by more than a threshold amount. The processor is further caused to aggregate the plurality of sets of artifact vertices associated with the plurality of reference vectors to define a master set of artifact vertices; calculate a weighted value for each vertex of the plurality of vertices in the input surface mesh, wherein the said weighted value is based on a normalized distance of the vertex to a nearest artifact vertex of the master set of artifact vertices; and apply a smoothing algorithm to the input surface mesh, wherein the weighted values are used to adjust the smoothing algorithm to obtain a smoothed output surface mesh.

In some embodiments, wherein the plurality of reference vectors are defined by a plurality of coordinate vectors associated with the input surface mesh.

In some embodiments, the input surface mesh is generated using computer-tomography (CT) image data, and wherein the plurality of reference vectors are defined by at least the two coordinate vectors of CT image data and a stack direction of the CT image data used to generated the input surface mesh.

In some embodiments, the plurality of reference vectors includes at least three reference vectors.

In some embodiments, the normalized angles are calculated by performing a dot product of the reference vector and the plurality of normal vectors.

In some embodiments, the weighted value for each vertex of the plurality of vertices in the input surface mesh is computed by comparing the normalized distance to a threshold distance.

In some embodiments, the weighted value for each vertex is normalized on a quadratic scale.

In some embodiments, the computing system further comprising a display, wherein the processor is further caused to display a graphical representation of the smoothed output surface mesh on the display.

In some embodiments, the processor is further caused to control a robotic device based on the output surface mesh by defining a smooth haptic boundary based on the output surface mesh.

In some embodiments, the processor is further caused to provide smooth haptic feedback via the robotic device based on an interaction between the smooth haptic boundary and an interaction point associated with a surgical tool of the robotic device.

Various embodiments of the present disclosure relate to a non-transitory computer-readable media having computer-executable instructions embodied therein that, when executed by a processor of a computing system, causes the computing system to perform operations comprising receiving an input surface mesh, the input surface mesh comprising a plurality of vertices; identifying a plurality of reference vectors; then for each of the plurality of reference vectors, identifying a set of artifact vertices from the plurality of vertices of input surface mesh by calculating normalized angles between the reference vector and a plurality of normal vectors, the plurality of normal vectors associated with a plurality of faces defined in the input surface mesh, and defining a vertex of the plurality of vertices of the input surface mesh as an artifact vertex if the normalized angles associated with a set of the faces adjacent the vertex are different by more than a threshold amount. The operations further comprise aggregating the plurality of sets of artifact vertices associated with the plurality of reference vectors to define a master set of artifact vertices; calculating a weighted value for each vertex of the plurality of vertices in the input surface mesh, wherein the said weighted value is based on a normalized distance of the vertex to a nearest artifact vertex of the master set of artifact vertices; and applying a smoothing algorithm to the input surface mesh, wherein the weighted values are used to adjust the smoothing algorithm to obtain a smoothed output surface mesh.

In some embodiments, the plurality of reference vectors are defined by a plurality of coordinate vectors associated with the input surface mesh.

In some embodiments, the input surface mesh is generated using computer-tomography (CT) image data, and wherein the plurality of reference vectors are defined by at least the two coordinate vectors of CT image data and a stack direction of the CT image data used to generated the input surface mesh.

In some embodiments, the plurality of reference vectors includes at least three reference vectors.

In some embodiments, the normalized angles are calculated by performing a dot product of the reference vector and the plurality of normal vectors.

In some embodiments, the weighted value for each vertex of the plurality of vertices in the input surface mesh is computed by comparing the normalized distance to a threshold distance.

In some embodiments, the weighted value for each vertex is normalized on a quadratic scale.

In some embodiments, the operations further comprise generating a graphical representation of the smoothed output surface mesh for display on a display screen.

In some embodiments, the operations further comprise controlling a robotic device using the smoothed output surface mesh by defining a smooth haptic boundary based on the output surface mesh.

In some embodiments, the operations further comprise providing smooth haptic feedback via the robotic device based on an interaction between the smooth haptic boundary and an interaction point associated with a surgical tool of the robotic device.

DETAILED DESCRIPTION

Figure 1:
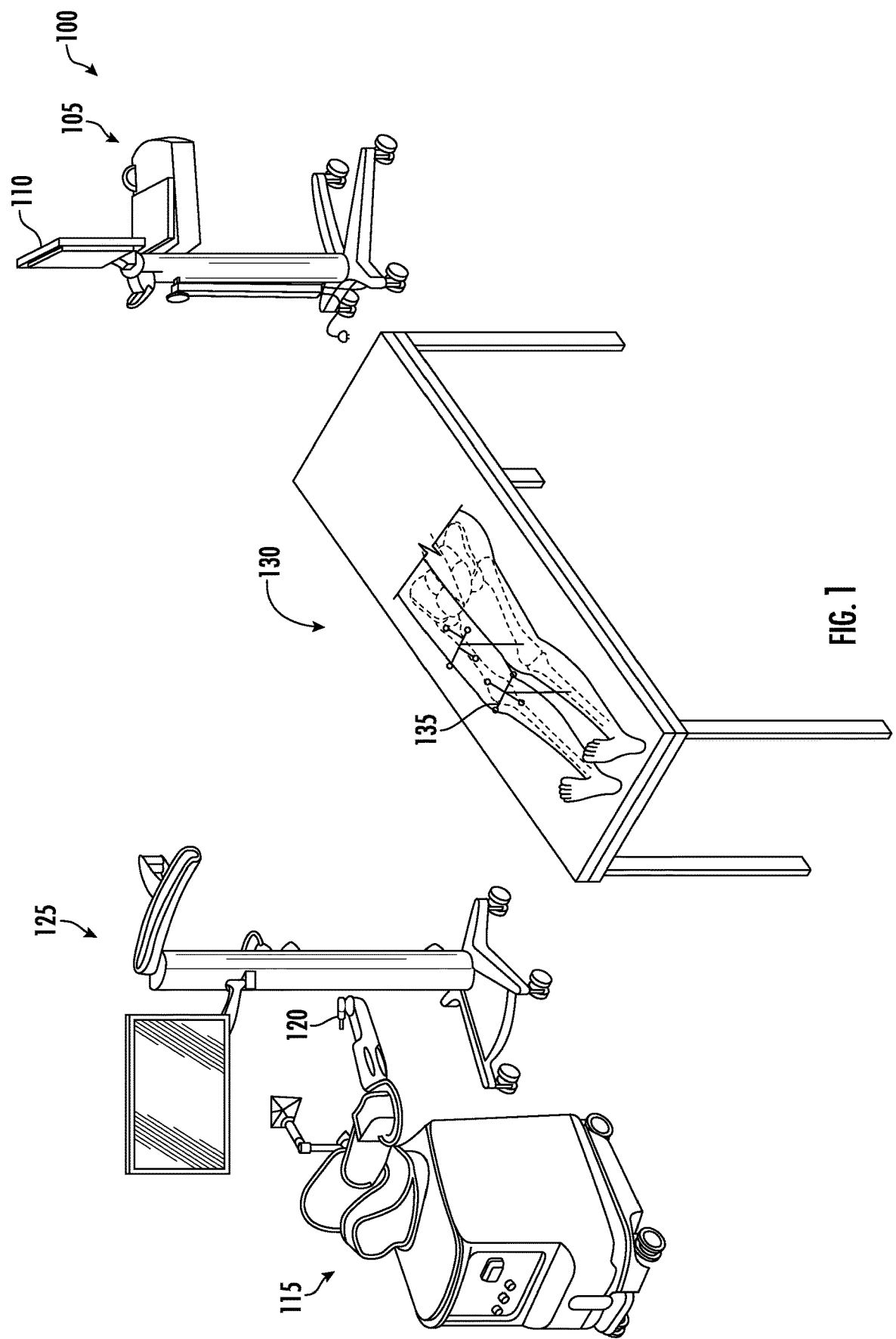
FIG. 1 depicts a surgical system for performing a computer-assisted surgical procedure, according to various embodiments.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods for selectively smoothing artifacts, such as staircase artifacts, for medical surface meshes are shown and described. The systems and methods described herein rely upon a generated surface mesh from computer tomography (CT) or magnetic resonance imaging (MM) data. The target anatomy is isolated using either manual or computer-aided segmentation techniques. The image data is then transformed into a surface mesh by any known surface mesh method, such as, but not limited to, the Marching Cubes algorithm, or marching tetrahedrons methods. By result of these processes, undesired artifacts can arise that produce model error. The systems and methods described herein generally identify these features and assign weighted values to each vertex in the surface mesh based on its proximity to said features. The model and its weighted values are then used, according to several embodiments described herein, to generate a new surface mesh or modify the existing surface mesh data. The outputted smoothed surface mesh can be used for more accurate surgical visualization and planning, intraoperative navigation, and control of robotically-assisted surgical devices.

The systems and methods described herein more accurately and more fully remove staircase artifacts from surface meshes while better maintaining the original mesh model volume. The disclosed embodiments thereby allows for more accurate surface models of anatomy, especially in high curvature anatomy applications (e.g., acetabular rim, ankle bones, vertebrae, etc.). For example, as described in detail below, the analysis of artifacts in relation to three or more reference directions (reference vectors) allows more complete identification of artifact vertices. This disclosure also describes more efficient and robust methods for running surface-smoothing computational processes not previously described in prior art. These include improved methods for normalizing artifact characteristics and vertex weights for use across different sized surface mesh or surface mesh features.

A surface mesh can be described herein by the set of vertices and faces that define the surface mesh. In some embodiments, the surface mesh can also be described by sets of vertices, edges, and/or faces. A vertex of a surface mesh is defined by a location in a three dimensional space as defined by the data structure of the surface mesh. An edge is defined as the vector between two vertices. The faces of a surface mesh are geometric surfaces defined by a plurality of neighboring vertices. Alternatively, a face can be described in terms of its associated edges, or a combination of its associated edges and vertices. Any adjustment of a given vertex described herein refers to adjustments made to the location of said vertex. Additionally, adjustments to a vertex imply a change in geometric shape or orientation to the vertex's associated edges and faces. In regards to the description of staircase artifact features herein, the staircase artifacts can be described by the associated vertices, edges, faces, or some combination thereof that compose the staircase feature. Descriptions of the size or magnitude of a staircase artifact are in reference to the magnitude of induced model error generated by the artifact. That is, a larger artifact is defined by a set of vertices that deviate in position from the ideal surface structure of the scanned anatomy by a greater magnitude.

U.S. Pat. No. 8,010,180, titled "Haptic Guidance System and Method," granted Aug. 30, 2011, which is hereby incorporated by reference herein in its entirety, describes an exemplary surgical system with which the presently described system and methods may be used.

FIG. 1 depicts, according to one embodiment, an assistive surgical system 100 comprising a computing system 105, a robotic device 115, a display screen 110, and a tracking device 125. The system 100, by way of robotic device 115, provides feedback and control to a surgical tool 120 during a surgical procedure. In some embodiments, the robotic device 115 provides haptic feedback. In other embodiments, the robotic device 115 performs automated or autonomous movements. The surgical system 100 is also configured to incorporate pertinent anatomical data of target anatomy 135 for patient 130 to plan surgical procedures before operation, display on screen 110, and set virtual control boundaries for robotic device 115. In some embodiments, the assistive surgical system 100 is the haptic guidance system described in the aforementioned U.S. patent "Haptic Guidance System and Method".

Within the computing system 105, there exist hardware and software for operation and control of surgical system 100, which enable surgical system 100 to perform various functions related to surgical planning, navigation, image guidance, and/or tool guidance. The computing system 105 may also be configured to provide boundary conditions to the feedback device 115. A user (such as a surgeon) may also use the computing system 105 for pre-operation planning and visualization for target anatomy 135.

Computing system 105 comprises a memory device that holds saved computer CT image files of the target anatomy 135. In another embodiment, the computing system 105 accesses patient image data via an external database. Computing system 105 may store segmentation and surface-mesh software configured to convert said two-dimensional slices into three-dimensional representations. In another embodiment, the isolated surface mesh is pre-processed and available in memory of computing system 105. In yet another embodiment, a surface mesh can be accessed via an external database. Computing system 105 may also contain software and hardware to selectively correct undesired model artifacts in said surface mesh. In one embodiment, the computing system 105 applies a feature-specific smoothing algorithm to identify and remove staircase artifacts. The surface mesh representation can then be displayed to a screen 110 for view. The smoothed surface mesh can also be used to establish virtual boundaries for providing feedback to the user via robotic device 115, to control the robotic device 115 to perform automated or autonomous actions, to provide intraoperative surgical navigation (e.g., via display screen 110 or some other display, for example an augmented reality display), and/or provide other intraoperative functionality based on the smoothed surface mesh.

In the example shown, the robotic device 115 is a surgical device configured to be manipulated by a user (such as a surgeon) to move a surgical tool 120 to perform a procedure on a patient, such as sculpting a surface of a bone to receive an implant. In one embodiment, the robotic device 115 provides haptic guidance to the surgeon to maintain the tool 120 within a predefined virtual boundary. The haptic object establishes a desired relationship between the anatomy and the tool 120, such as desired position, orientation, velocity, and/or acceleration of the tool 120 relative to the anatomy 135. In operation, when the surgeon moves the tool 120 in a manner that violates the desired relationship (such as when the tool 120 contacts a virtual boundary), the haptic device 115 provides haptic guidance in the form of tactile feedback (e.g., vibration) and/or force feedback (e.g., force and/or torque) to the surgeon. The haptic guidance may be experienced by the surgeon, for example, as resistance to further tool movement in the direction of the virtual boundary. As a result, the surgeon may feel as if the tool 120 has encountered a physical object, such as a wall. In this manner, the virtual boundary functions as a virtual cutting guide. Thus, the surgical system 100 limits the surgeon's ability to physically manipulate the robotic device 115 (e.g., by providing haptic guidance and/or a limit on user manipulation of the haptic device 115) by implementing control parameters based on a relationship between the anatomy and a position, an orientation, a velocity, and/or an acceleration of a portion of the haptic device 115, such as the tool 115. In addition to haptic objects, the relationship may be based on predefined parameters, such as a predefined depth that limits total travel of the tool 120.

In other embodiments, the robotic device 115 is configured to perform automated and/or autonomous movements to facilitate performance of a surgical procedure. For example, the robotic device 115 may autonomously move the tool 120 relative to the anatomy 135 to modify (cut, drill, ream, etc.) the anatomy 135 with the tool 120. In still other embodiments, the robotic device 115 is a handheld robotic device configured to control operation and movement of the tool 120 relative to the anatomy 135. For example, the robotic device 115 may be configured to retract and/or stop operation of the tool 120 when the tool 120 reaches a virtual boundary, thereby confining the tool 120 from operating on anatomical features outside the virtual boundary. These and other variations of robotically-assisted feedback, assistance, automation, etc. are possible in various embodiments.

The tracking (or localizing) system 125 is a system generally configured to determine the pose (i.e., the position and orientation) of one or more objects during a surgical procedure to detect movement and capture poses of said objects. In some embodiments, the tracking system 125 determines the pose of surgical tool 120 in relation to the target anatomy 135. The tracking system 125 can use any combination of hardware and software, such as, but not limited to, optical, electromagnetic, radio, or acoustic methods as are well known.

Figure 2A:
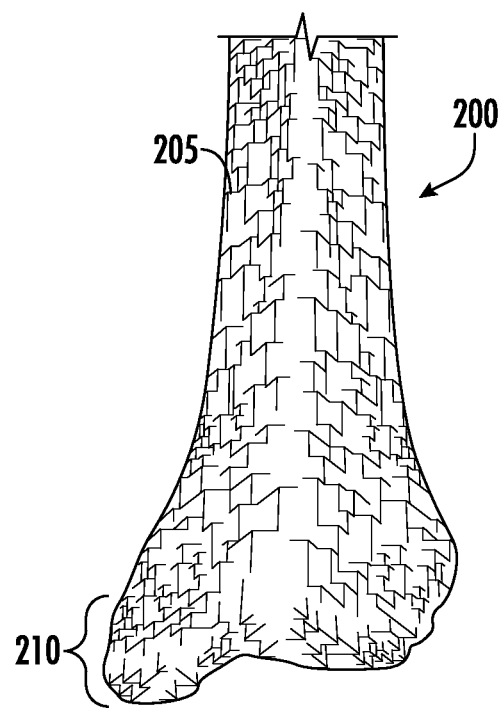
FIG. 2A depicts a segmented surface mesh, according to various embodiments.
Figure 2B:
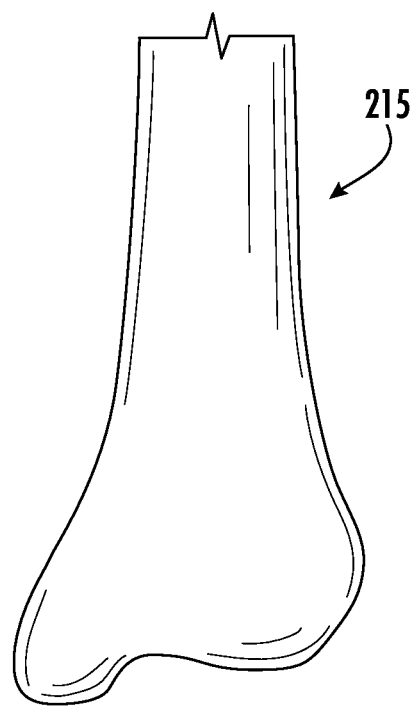
FIG. 2B depicts a smoothed surface mesh, according to various embodiments.

FIG. 2A illustrates a surface mesh 200 of a patent anatomy. The anatomy can be of an organ or tissue of any nature, including bone, vascular, or muscular anatomy. Surface 215 in FIG. 2B represents a smoothed surface mesh of a sample anatomy after being selectively smoothed by an embodiment of the present invention. The smoothed surface 215 ideally preserves small-detailed features of the scanned anatomy, such as small veins, protrusions, or any other anatomical feature, while removing staircase artifacts. This helps improve surface models to more accurately represent the smooth nature of most biological anatomies.

The surface mesh 200 is generated from CT image data for the target anatomy by any given surface mesh software. For example, 2-dimensional CT images may be arranged and aligned in a stack, and a 3-dimensional segmentation volume may be generated to intersect a surface of the target anatomy shown in each of the CT images in the stack. By nature of discretization and the layering of two-dimensional CT images into a 3D-format, the software construction may create three-dimensional artifacts, such as staircase artifacts 205. For example, staircase artifacts 205 may be caused by jumps between adjacent CT image layers in the 3-D model. These artifacts are particularly problematic near areas of high curvature, such as portion 210 shown in FIG. 2. It is noted that these staircase artifacts 205 create erroneous representations of the smooth-faced features of the scanned anatomy and introduces error in, for example, virtual boundary creation or surgical navigation. Artifacts 205 can be oriented in any of the three reference directions of the segmentation volume (such as, the defined x, y, and z axes). Generically, the reference directions can be described in several ways, such as the defined two-dimensions of the CT images plus the stack direction of the image slices.

Figure 3:
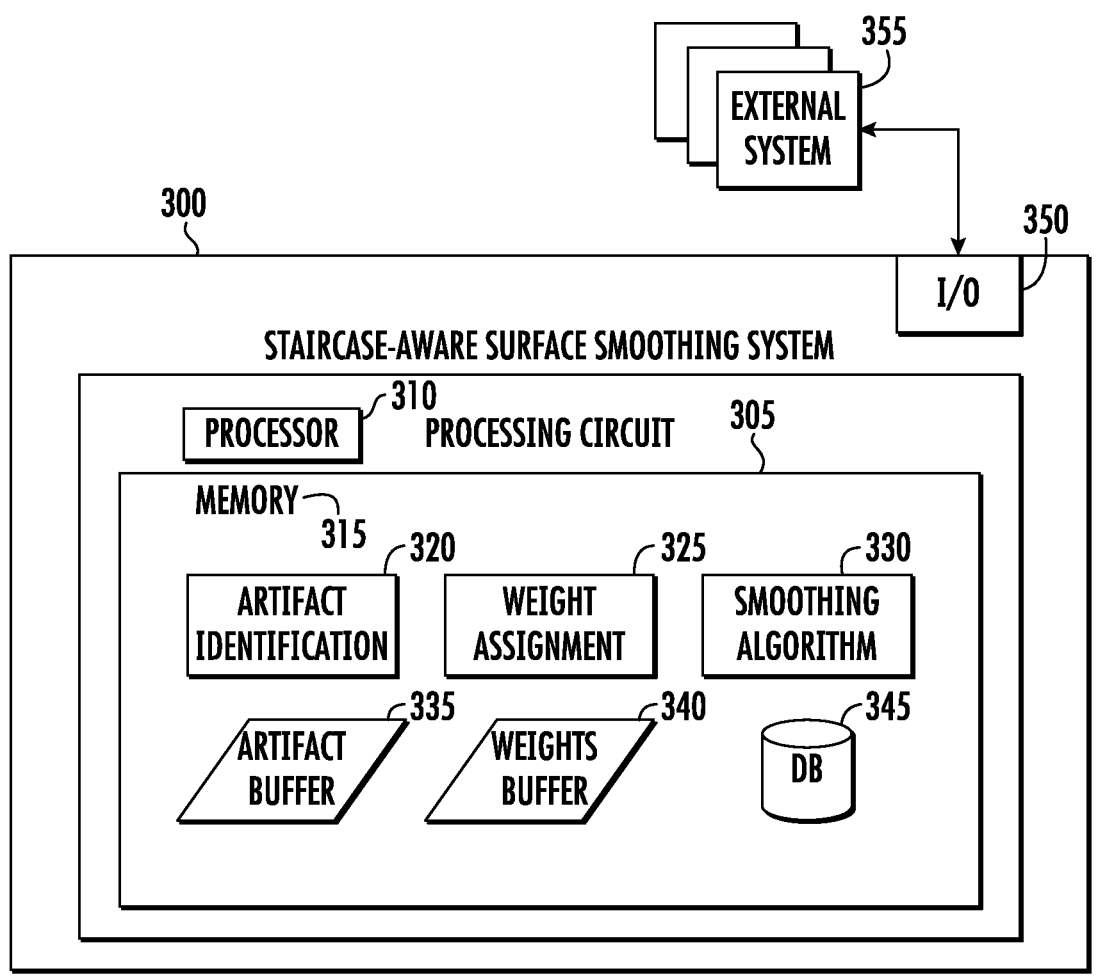
FIG. 3 is a block diagram of a staircase-aware surface smoothing system, according to various embodiments.
Figure 4:
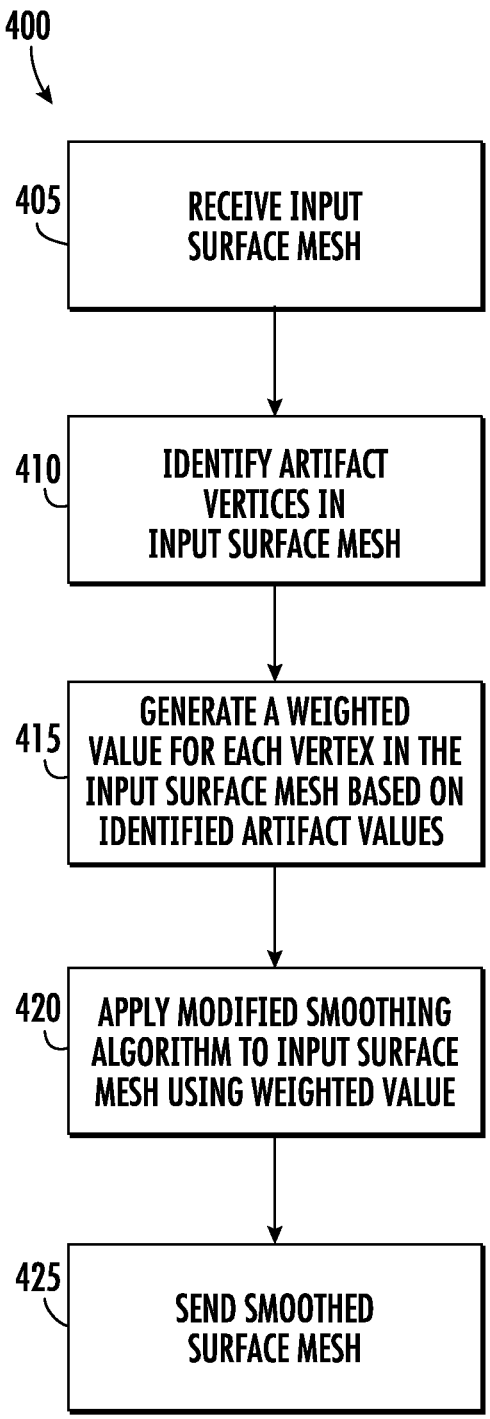
FIG. 4 is a flowchart of a staircase-aware surface smoothing process, according to various embodiments.

Referring now to FIGS. 3-4, a staircase-aware surface smoothing system 300 is shown in FIG. 3 which may be configured to execute process 400 shown in FIG. 4, according to exemplary embodiments. The smoothing system 300 may contain a processing circuit 305 and a communication interface 350. The smoothing system 300 may be configured to selectively smooth staircase artifacts in surface meshes to generate smoothed surface meshes. In some embodiments, the smoothing system 300 may be implemented locally at the computing system 105 of the surgical system 100. In some embodiments, the smoothing system 300 is provided at an imaging system, for example at a CT scanner and within image processing circuitry associated therewith. In some embodiments, the smoothing system 300 is provided remotely from an imaging system and from the surgical system 100, for example on a cloud-based computing resource, at a processing center of a segmentation service provider, or on a personal computer of a health care provider (e.g., surgeon, technician, etc.). The smoothing system 300 may also be distributed across multiple computing resources in some embodiments.

The staircase-aware surface smoothing system 300, in some embodiments, communicates with an external system 355 via I/O communications interface 350. Communication interface 350 can be or include wired or wireless communication interfaces (e.g., jacks, antennas, transmitters, receivers, transceivers, wire terminals, etc.) for conducting data communications between system 300 and external systems 355. In various communications via interface 350 may be direct (e.g., local wired or wireless communications) or via a communications network (e.g., a WAN, the internet, a cellular network, etc.). For example, interface 350 can include an Ethernet card and port for sending and receiving data via an Ethernet-based communications link or network. In another example, interface 350 can include a Wi-Fi transceiver for communicating via a wireless communications network. Multiple external systems 355 can be interfaced to I/O communication interface 350 based on various embodiments and can be implemented within the same or separate interfaces.

In some embodiments, the external system 355 is an external storage device, and the communication interface 350 is configured to receive from the external storage device data for a given surface mesh or a command to smooth a given surface mesh. Communication interface 350 may also be configured to export the output smoothed surface mesh to the external storage device after processing. In some embodiments, external system 355 is a display, such as display 110, or a processing circuit coupled to a display, in which the output smoothed surface mesh can be viewed on the display. In some embodiments, the external system 355 is a user input device, and communication interface 350 is a user interface.

In some embodiments, the external device 355 is a display system. The display system may be configured to render a graphical representation of the output smoothed surface mesh on a display. The display system may be configured to view the smoothed surface mesh from several perspectives. The rendered graphical representation may also be integrated within a particular application configured to further manipulate or change the output surface mesh.

In some embodiments, the external system 355 is a computing system for controlling the assistive surgical system 100, such as computing system 105. In some such embodiments, the communication interface 350 is configured receive data from computing system 105 to smooth a given surface mesh, and to export the output smoothed surface mesh back to the computing system 105 for use in the assistive surgical system 100. Assistive surgical system 100 may use the smoothed surface mesh in a haptic feedback system. Assistive surgical system 100 may display the output smoothed surface mesh on display 110. Assistive surgical system 100 may also export or store the smoothed surface mesh to an external server or storage device. In some embodiments, the smoothing system 300 may be provided within the assistive surgical system 100 or within computing system 105. Communications interface 350 may be configured to use any interface included in computing system 105 for interfacing to devices connected to computing system 105. For example, communications interface 350 may interface with a user input interface of the computing system 105 to receive and send information to a user.

For haptic feedback control, smoothing system 300 may be configured to control a robotic device based on an output smoothed surface mesh by defining a smooth haptic boundary based on the smoothed surface mesh. Smoothing system 300 may be configured to provide or otherwise assist in smooth haptic feedback via the robotic device based on an interaction between the smooth haptic boundary and an interaction point associated with a surgical tool of the robotic device. The interaction point may be a location of a contact point on the surgical tool relative to an anatomy of the patient, the contact point being a part of the surgical tool that touches or affects the anatomy. The haptic feedback may define safe areas for the surgical tool and restricted areas of the surgical tool or contact point. The haptic feedback may restrict or impede movement of the surgical tool based on the safe and restricted areas. By using the smoothed surface mesh for haptic feedback, the haptic boundary can more accurately reflect the actual profile or desired boundary of the modeled anatomy, and may result in a smoother-feeling haptic feedback. Embodiments of haptic feedback control are further described in U.S. Pat. No. 8,010,180, which is incorporated by reference herein in its entirety.

The processing circuit 305 comprises a processor 310 and a memory device 315. Processor 305 may be or include one or more microprocessors, an application specific integrated circuit (ASIC), a circuit containing one or more processing components, a group of distributed processing components, circuitry for supporting a microprocessor, or other hardware configured for processing. According to an exemplary embodiment, processor 305 is configured to execute computer code stored in memory 315 to complete and facilitate the activities described herein.

The memory device 315 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 315 is communicably connected to the processor 310 to provide computer code or instructions to the processor 310 for executing at least some of the processes described herein. Moreover, the memory device 315 comprises or includes tangible, non-transient volatile memory or non-volatile memory. Accordingly, the memory device 315 may include database components, object code components, script components, or any other type of information structure for supporting the various activities and information structures described herein. For example, memory 315 is shown to include various modules which are computer code modules (e.g., executable code, object code, source code, script code, machine code, etc.) configured for execution by processor 310. When executed by processor 310, processing circuit 305 is configured to complete the activities described herein.

Memory 315 is shown to include various modules for executing process 400 on processor 310. Memory 315 includes an artifact identification module 320, a weight assignment module 325, and a smoothing algorithm module 330. The artifact identification module 320 stores code that, when executed by the processor 310, enables the processing circuit 305 to identify which vertices of a surface mesh are related to a staircase artifact. Weight assignment module 325 stores code that, when executed by the processor 310, enables the processing circuit 305 to assign values to all vertices of a surface mesh based on their proximity to an artifact vertex. Smoothing algorithm module 330 stores code that, when executed by the processor 310, enables the processing circuit 305 to apply a known smoothing algorithm to the vertices of a surface mesh in relation to their weighted values. The functions stored in modules 320-330 are described in greater detail below with respect to subsequent figures.

Memory 315 also includes one or more buffers 335-340 for temporarily storing data during the smoothing process. Memory 315 includes an artifact buffer 335 for storing the identity of vertices declared artifact vertices. In some embodiments, artifact buffer 335 stores a master set of the identities all identified artifact vertices in a surface mesh. In some embodiments, artifact buffer 335 is partition to store identified artifact vertices based on the reference direction or directions by which they were identified, and may include data that associates each artifact vertex with the reference directions used to identify the vertex as an artifact vertex. Memory 315 also includes a weights buffer 340 for storing the assigned weighted values for all vertices of a surface mesh. The use of buffers 335 and 340 will be described in greater detail below with respect to subsequent figures. Memory 315 can also include database 345 to store and retrieve patient data, CT data, or surface mesh data. Database 345 may be any storage medium, server, or device. In some embodiments, database 345 contains temporary storage of surface mesh data while the surface mesh is being smoothed by system 300. In some embodiments, database 345 is integrated into external systems 355.

Referring again to FIG. 4, a flowchart of the staircase-aware smoothing process 400 performed by staircase smoothing system 300 is shown. Staircase smoothing system 300 can be configured to receive an input surface mesh (405), identifying vertices associated with staircase artifacts (410), generate weighted values for each vertex in the input surface mesh based on the identified staircase artifacts (415) and selectively smoothing the relevant surfaces using a smoothing algorithm (420). In some embodiments, staircase smoothing system 300 may also be configured to export the output surface mesh after completion of process 400 (step 425), such as to the external system 355 via I/O interface 350 or to database 345 for storage or use in assistive surgical system 100.

Staircase smoothing system 300 receives an input surface mesh at step 405. In some embodiments, system 300 receives the input surface mesh from computing system 105 of the assistive surgical system 100. In some embodiments, system 300 receives the input surface mesh from a storage device, such as an external storage device or database 345. In some embodiments, system 300 also receives a command to smooth the received input surface mesh.

Staircase smoothing system 300 then implements an artifact identification process at step 410. The system 300 generates a list of identified artifact vertices from the input surface mesh. In some embodiments, system 300 uses multiple reference vectors to calculate face orientations near a particular vertex. In some embodiments, artifact identification process of step 410 is executed by the artifact identification module 320 and stores the resulting identities in artifact buffer 335. The various functions performed at step 410 will be described in more detail in references to FIG. 5.

After identifying artifact vertices at step 410, staircase smoothing system 300 then generates weighted value for each vertex at step 415. The generated weighted values are indicative of the extent to which each vertex in a surface mesh should be smoothed based on their proximity to an artifact vertex identified by system 300 at step 410. Proximity can be determined by a distance calculation, which can be of any known method, such as topological distance or Euclidean distance. In one embodiment, the weight value process 415 is executed by the weight assignment module 325 of system 300 and stores weight values in weight buffer 340. In some embodiments, the weighted values are normalized to a scale between zero and one. Various implementations of the functions performed at 415 will be described in more detail in reference to FIG. 8.

Process 400 may include a smoothing algorithm process 420. In smoothing process 420, the weight values of each vertex are used to selectively smooth a surface mesh. The smoothing process can be any known smoothing algorithm, such as, but not limited to, Laplacian, Vollmer, or Taubin smoothing algorithms. Uniform smoothing algorithms generally adjust the position of each vertex based at least on the positions of its neighboring vertices. Thus, vertices that exist as outliers to their neighboring vertices receive adjusted positions that are closer in proximity to their neighboring vertices. In step 420, the extent to which vertices are adjusted is tuned based at least in part on the weighted value assigned to each vertex. The smoothing process 420 may be executed by smoothing algorithm module 330 using values stored in the weights buffer 340. The smoothing process 420, in some embodiments, generates a new smoothed surface mesh data set. In other embodiments, the smoothing process 420 modifies an existing surface mesh in its current storage location, including, but not limited to, an internal storage buffer, an internal database, or an external system.

The smoothing process 420, in some embodiments, can be implemented by adapting a known general smoothing algorithm to accept weighted values from the weights buffer 340, for example. In this embodiment, any known general smoothing algorithm can be used, such as Laplacian, Vollmer, or Taubin smoothing algorithms. The weighted values can generally be used to determine the extent to which a given vertex will be corrected by the smoothing method. For example, a small weight assigned to a vertex implies little to no correction will be made to the vertex, whereas a large weighted value indicates the vertex will be subject to the normal correction of the smoothing algorithm. An example of an adapted smoothing algorithm is described in reference to FIG. 8.

Figure 5:
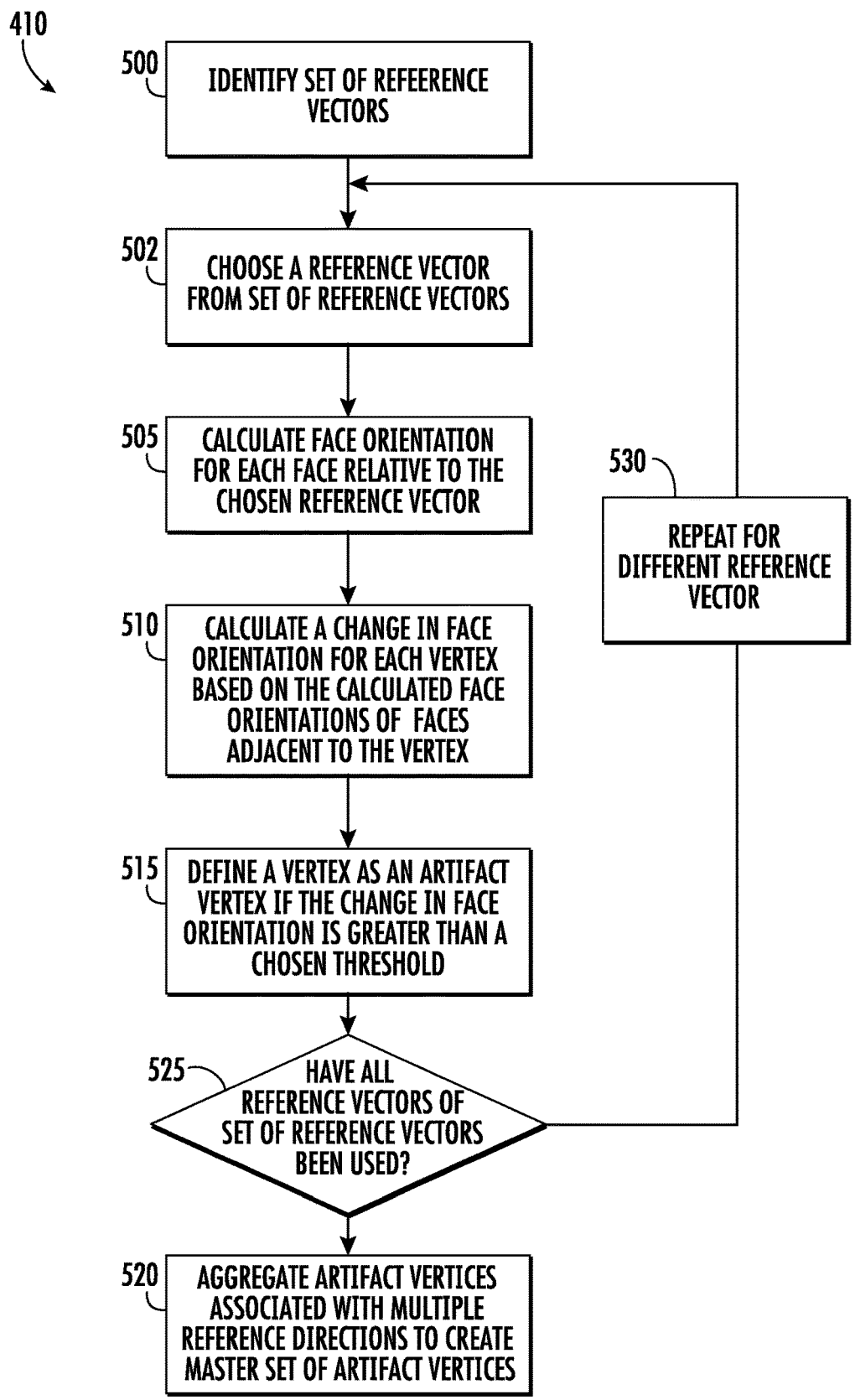
FIG. 5 is a flowchart of a staircase identification process, according to various embodiments.

Referring now to FIG. 5, a flowchart of the artifact identification process 410 is shown, according to an exemplary embodiment. In executing the artifact identification process 410, staircase smoothing system 300 generates a list of identified artifact vertices in a surface mesh based on the calculated change in face orientation for each vertex. The list of identified artifact vertices can then be used by system 300 in subsequent steps of process 410 to generate weighted values based on the identified artifact vertices. In some embodiments, the list is saved in an artifact buffer 335 when completed by module 320.

Process 410 includes step 500 in which the staircase smoothing system 300 identifies a set of reference vectors to use to identify artifacts in the input surface mesh. In some embodiments, the set of reference vectors is chosen by a user via a user input device connected to I/O interface 350. In some embodiments, the set of reference vectors are stored in memory 315. In some embodiments, the coordinate vectors associated with the input surface mesh or input surface mesh data structure are used as the set of reference vectors (which may be referred to as the x, y and z directions). In some embodiments, the set of reference vectors is the two dimensions of the CT image and the stack direction of the CT image collection used to generate the surface mesh. A set of reference vectors may include more or less reference vectors than in the examples described herein (e.g., two reference vectors, four reference vectors, five reference vectors, etc.), and may be orthogonal to one another or may have some other relative orientation in various embodiments. For example, a set of reference vectors may be selected based on the orientation of typical or expected artifacts to be smoothed by the staircase smoothing system 300.

Figure 6A:
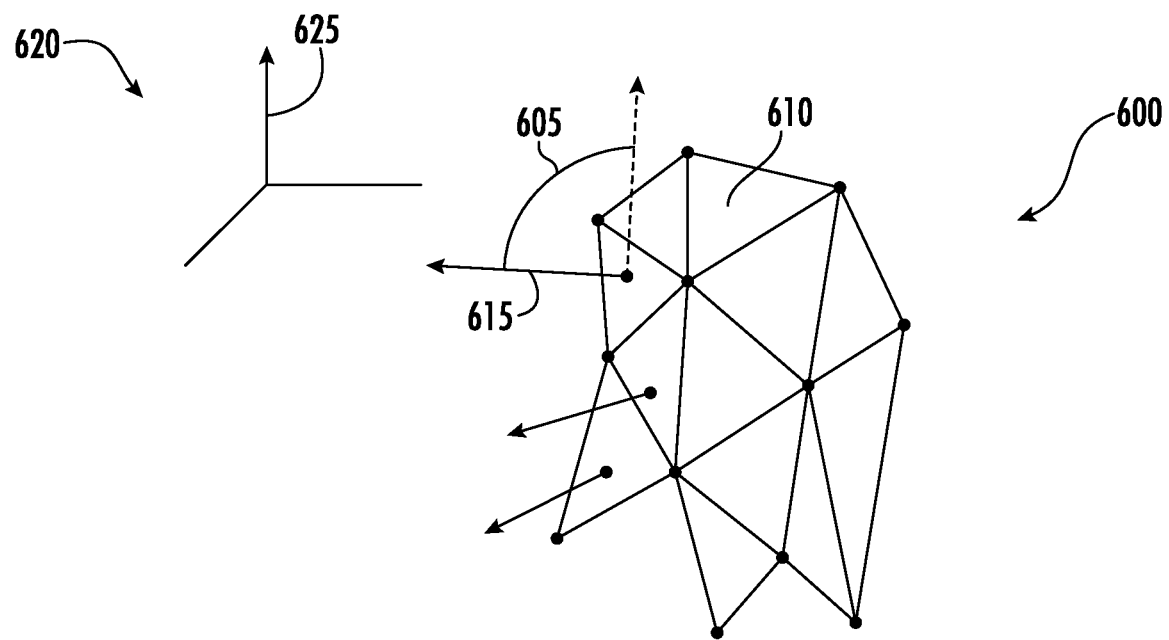
FIGS. 6A-B are illustrations of the calculation of face orientation for a surface mesh, according to various embodiments.

At step 502, system 300 selects one of the reference vectors from the set of reference vectors to calculate a face orientation for each face of the input surface mesh at 505. System 300 calculates the face orientation for each face of the surface mesh relative to the selected reference vector. Referring to FIG. 6A, a face orientation 605 can be calculated for each face 610 of a surface mesh 600 by comparing the normal vector 615 of the given face 610 in relation to a determined reference vector 625 of the set of reference vectors 620. The face orientation 605 is then calculated as the angle between the two vectors. In some embodiments, the normal vector 615 and reference vector 625 are both unit vectors. In another embodiment, the same two vectors are identified, and the dot product is taken between the two vectors to generate the face orientation angle. The face orientation may be calculated in some embodiments according to the equation:

$$a_{fi} = 1 - \text{abs}(N_{fi} \cdot D_R)$$

where $0 \le a_{fi} \le 1$

Where $a_{fi}$ is the normalized angle for the face orientation of face $f_i$ in the input surface mesh, $N_{fi}$ is the normal unit vector of face $f_i$, $D_R$ is the chosen reference unit vector, and $N_{fi} \cdot D_R$ is the dot product between $N_{fi}$ and $D_R$. This implementation may allow for faster computation since dot product calculations are faster on a processing circuit than inverse trigonometric functions. By using unit vectors, the face orientation $a_{fi}$ will always be between zero and one. As understood with dot product calculation, vectors that are perpendicular produce a dot product value of zero, and vectors that are parallel produce a dot product value of one; thus, according to this implementation, a face with a normal vector parallel to the reference vector generates a face orientation value of zero and normal vectors perpendicular to the reference vector generates a face orientation value of one.

One advantage of comparing normal vectors 615 to a reference vector 625 is so that only artifacts oriented in the reference direction are considered, since often times artifacts are generated as a byproduct of digitization of otherwise continuous data. In this way, artifact-shaped features present in the surface mesh model, but which were not generated as a result of the surface mesh process, are preserved.

Figure 6B:
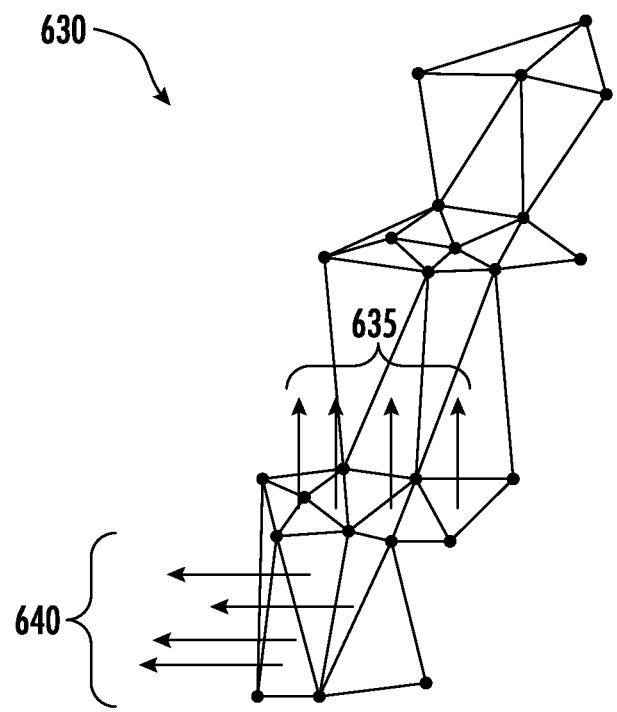

At step 510, system 300 calculates the change in face orientation for each vertex based on the orientation of the surface faces adjacent to the said vertex. In one embodiment, the change in face orientation is calculated as the difference between the largest face orientation among neighboring faces adjacent to the vertex and the smallest face orientation among the same neighboring faces. In some embodiments, this change in face orientation is normalized to be between zero and one, where zero represents no change in face orientation, and one represents a 90 degree change in face orientation. In embodiments where a dot product is used in step 505 with unit vectors, the change in face orientation is already normalized to a scale between zero and one and may not require further modification in regard to normalization. In FIG. 6B, it is observed that for surface mesh vertices and faces characterizing a staircase feature 630, the two sets of normal vectors 635 and 640 that make up a stair artifact are perpendicular to each other (or nearly perpendicular), whereas general face surfaces (such as 600 in FIG. 6A) typically have near-parallel normal vectors to neighboring faces. In this embodiment of process 410, this distinction is the basis for identifying a vertex as an artifact.

At step 515, system 300 defines a vertex as an artifact vertex if the change in face orientation of step 510 is greater than a pre-defined threshold and does so for each vertex in the input surface mesh. The threshold can be chosen to vary how strict system 300 defines a vertex as an artifact. Threshold values may also be based on the system requirements for subsequent use, for example selected to facilitate creation of smooth and accurate haptic control boundaries. More strict thresholds (i.e., a threshold that identify fewer artifact vertices on average than other thresholds) protect non-artifact vertices from being incorrectly identified as an artifact, but is more likely to fail to recognize otherwise-known artifact vertices as being artifacts. Conversely, a less strict threshold (i.e., a threshold that identifies more artifact vertices on average than other thresholds) ensures nearly all artifact vertices are identified but may overcorrect non-artifact surfaces. In some embodiments, for example, a strict threshold may have a value of approximately 0.9, and a less strict threshold may have a value of approximately 0.6. This threshold is thus generally up to the discretion of the application or user preference.

At 525, system 300 determines if the functions performed at steps 502, 505, 510, and 515 should be repeated for a different reference vector in the set of reference vectors. Repeating the functions of 502, 505, 510, and 515 for different reference vectors can identify additional vertices that represent artifact features. In small-sized mesh applications, such as small-bone scanning, the artifacts generated in all reference directions are of sufficient magnitude to affect accuracy of the guidance, navigation, and/or robotic control that previous staircase-smoothing algorithms do not account for. By using multiple reference directions to identify artifact vertices, an improved system smoothing surface meshes can be achieved for improved guidance, navigation, control, and, in some cases, surgical outcomes. At 525, system 300 determines if there is a reference vectors in the set of reference vectors that has not been used in identifying artifact vertices. For example, three reference vectors may be used to identify artifact vectors before proceeding to step 520.

If a determination is made at step 525 that another reference vector is available to identify additional artifact vertices, the process 410 proceeds to step 530 where the next reference vector is identified for selection at step 502. The next reference vector is then used in step 505 to calculate a face orientation for each face, and those face orientations are used to define artifact vertices in step 510 and step 515 as described above. Additional artifact vertices may thereby be identified by each cycle through steps 500-530.

If a determination is made at step 525 that all reference vectors have been used to identify artifact vertices (i.e., used in execution of steps 502-515), the process 410 proceeds to step 520 where the artifact vertices associated with all reference vectors are aggregated into a master set of artifact vertices. The system 300 may thereby produce a master set of identified artifact vertices that include artifacts identified relative to multiple reference vectors, for example three reference vectors (e.g., x-, y-, and z-directions). The list of identified artifact vertices may be stored in artifact buffer 535 or some other portion of memory 315.

Figure 7:
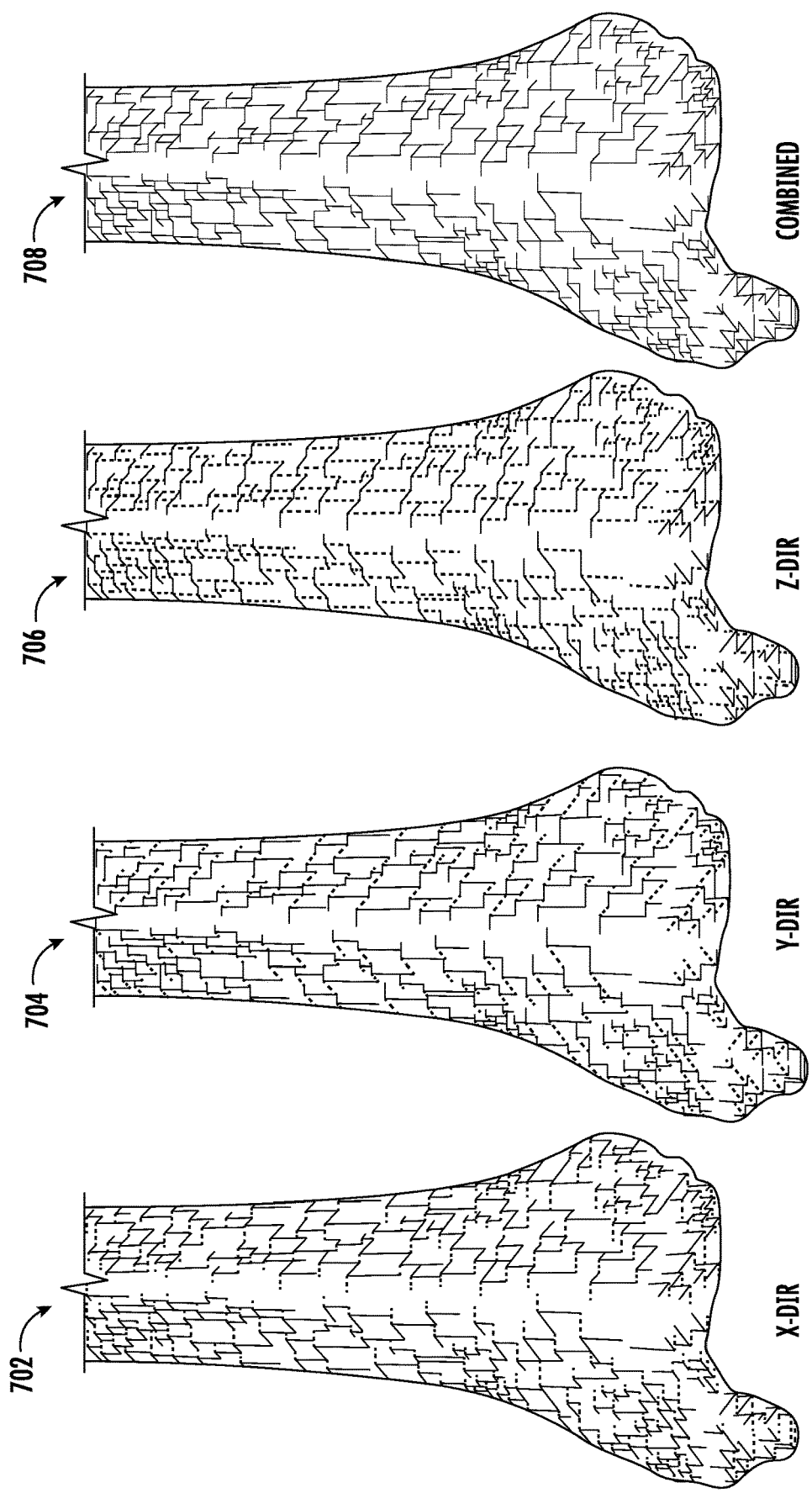
FIG. 7 is an illustration of example results of the staircase identification process of FIG. 5, according to various embodiments.

Referring to FIG. 7, a set of illustrations of an input surface mesh is shown with artifacts highlighted, according to an exemplary embodiment. In particular, FIG. 7 shows a first view 702 showing artifacts identified using the x-direction as the reference vector, a second view 704 showing artifacts identified using the y-direction as the reference vector, a third view 706 showing artifacts identified using the z-direction as the reference vector, a fourth view 708 showing the master set of artifacts identified using all three reference vectors as described for process 410. The dotted and solid lines of FIG. 7 represent staircase artifacts in the input surface mesh, where the lines are understood to comprise a plurality of at least vertices, edges, or faces that define the staircase artifact. The input surface mesh can comprise staircase artifacts relative to each of the three reference directions (here, the three reference directions are the x, y, and z directions of the input surface mesh coordinate system). Staircase artifacts represented by solid lines indicate vertices that were identified as artifact vertices relative to the subfigure's specified reference direction; staircase artifacts represented by dotted lines indicate vertices that were not identified relative to the subfigure's specified reference direction. It should be noted that view 702 (x-direction reference vector), view 704 (y-direction reference vector), and view 706 (z-direction reference vector) of FIG. 7 do not necessarily highlight the same sets of vertices. Thus, artifact vertices identified relative to only one reference direction may not properly identify all artifact vertices in an input surface mesh, and multiple reference directions may be used to identify all artifact vertices. By identifying artifact vertices relative to multiple reference directions, a master set of vertices is generated, which is shown in view 708 of FIG. 7. In some embodiments, substantially all of the artifacts in the input mesh can be identified using the approach of process 410.

Figure 8:
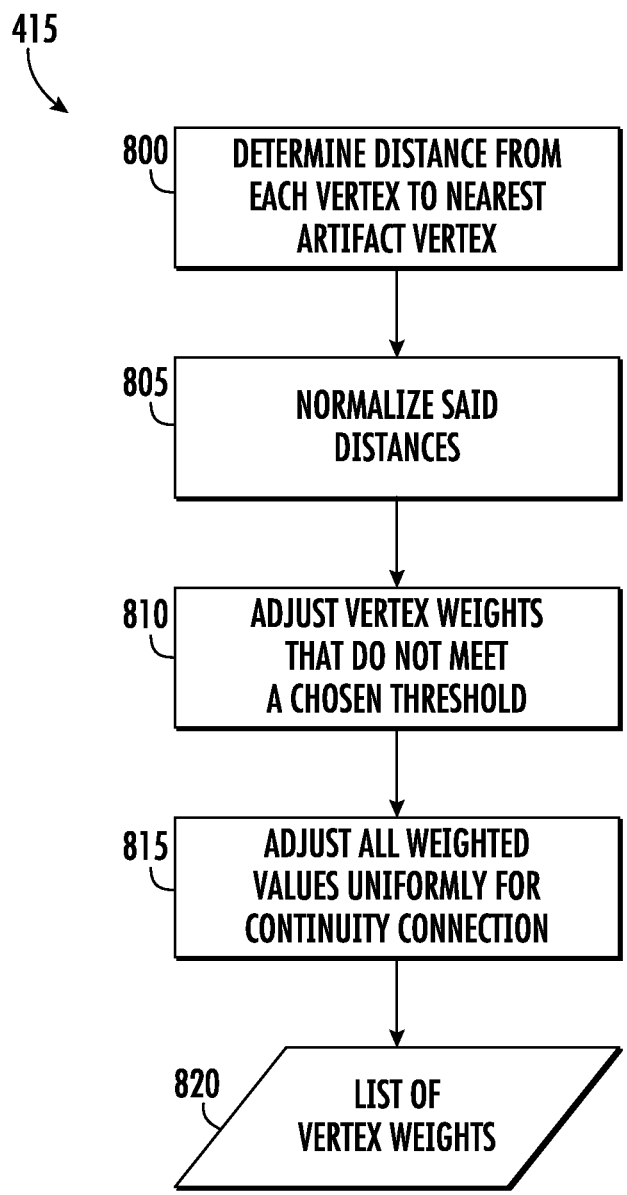
FIG. 8 is a flowchart of a weight assignment process, according to various embodiments.

Referring now to FIG. 8, a flowchart for the calculation of weighted values process 415 is shown. The weights assigned to each vertex determine the extent to which the system 300 correct a vertex's position during smoothing process 420. Various methods may be implemented by system 300 to generate weighted values for vertices based on identified artifact vertices. A preferred embodiment of generating weighted values is shown in FIG. 8 and described below.

In one embodiment, system 300 begins the functions of process 415 at 800 by calculating the distance of each vertex to the nearest artifact vertex (sometimes referred to herein as the distance $D_i$ for a vertex i). To determine the distance of a vertex to the nearest artifact vertex, system 300 may calculated the distance between that vertex and every identified artifact vertex in buffer 335, and determine which distance is the minimum distance. The determination of distance across the surface mesh can be of any known method, such as, but not limited to, Euclidean distances or geodesic distances. In some embodiments, the distances are scalar, and thus exclude negative numbers and are direction independent. In some embodiments, the distance may be a distance function, such as a sigmoid or exponential function. In some embodiments, the system 300 may be configured to store an association between the distance $D_i$ and identity of the nearest artifact vertex for each vertex i.

At 805, system 300 normalizes the distances determined at 800 into weighted values (used interchangeably with the term weights) such that the algorithm may be used for any scale or size of surface mesh. In some embodiments, the distances can be normalized to a simple linear scale. For example, after the distance to the nearest artifact is calculated for all vertices in step 800, the maximum of these distances is identified and used as the upper bound of the normalization process and zero as the lower bound (since any artifact vertex will have a distance of zero to the nearest artifact vertex, i.e., itself). The normalization process, then, maps all identified distances from 800 to a weighted value within the range of zero and one, where the weighted value for a given vertex can be calculated as:

$$w_i = \frac{(D_{max} - D_i)}{(D_{max} - D_{min})}$$

where $w_i$ is the weighted value for vertex i, $D_i$ is the distances between vertex i and the nearest artifact vertex, and $D_{max}$ and $D_{min}$ are the maximum and minimum distances $D_i$ of all vertices in the surface mesh, respectively. In some embodiments, $D_{min}$ is always set to zero. In this implementation, artifact vertices are assigned a weighted value of one (since artifact vertices have a distance to the nearest identified artifact vertex $D_i$ equal to zero), and vertices furthest from an artifact vertex are assigned a weighted value of zero (i.e., the vertex is identified as not needing to be smoothed as it is not close to an artifact).

In some embodiments, the distances are normalized on a quadratic scale to more distinctly isolate vertices most proximate to artifact vertices from those of general, non-artifact surfaces. In such an embodiment, the normalization process of step 805 identifies the maximum value from all calculated distances determined in step 800 and uses said maximum distance as the upper bound for the normalization process. The assigned weighted value for a vertex is calculated by:

$$w_i = \left(\frac{(D_{max} - D_i)}{(D_{max} - D_{min})}\right)^2$$

where $w_i$ is the weighted value for vertex i, $D_i$ is the distances between vertex i and the nearest artifact vertex, and $D_{max}$ and $D_{min}$ are the maximum and minimum distances $D_i$ of all vertices in the surface mesh, respectively. In some embodiments, $D_{min}$ is always set to zero. In these embodiments, artifact vertices are assigned a weighted value of one (since artifact vertices have a distance to the nearest identified artifact vertex $D_i$ equal to zero), and vertices furthest from an artifact vertex are assigned a weighted value of zero (i.e., the vertex is identified as not needing to be smoothed as it is not close to an artifact). By squaring the quotient, quotient values between zero and one are mapped according to a quadratic curve and shifts those values closer to zero than in the linear scale embodiment described above, thus focusing the smoothing algorithm on only vertices closest to artifact vertices. By using a quadratic scale, smaller surface mesh features can be preserved in the surface mesh model rather than being smoothed by overly-general smoothing algorithms. Additionally, the total surface mesh volume can be more accurate to the ideal surface mesh volume since overly general smoothing algorithms diminish model volumes.

At 810, system 300 may compare the normalized weights to a chosen threshold to make additional adjustments. In one embodiment, the vertices with weights that do not meet the threshold are deemed too insignificant in relation to an artifact feature and thus have their weighted values reduced to diminish the extent of later smoothness correction. In some embodiments, the vertices with weights that do not meet the threshold have their weights reduced to zero. In some embodiment, the threshold value could be a based on a vertex's distance to the nearest artifact vertex. The threshold can be varied to specify the extent to which the surface mesh should be smoothed. A larger threshold preserves more vertices in their original location, while a smaller threshold subjects more vertices to being smoothed in subsequent steps. In some embodiments, a large threshold distance may have a value of approximately 0.5, and a small threshold distance may have a value of approximately 0.2.

In other embodiments, step 805 may be performed before or after step 810 in various embodiments. An advantage to performing the functions of step 805 prior to those of step 810 is that a universal threshold can be used rather than an application specific threshold. Since the weighted values are normalized before being compared to the threshold value (step 805), the same universal threshold can be used so as to smooth all artifacts. Additionally, when using multiple reference directions in artifact identification process 410, artifacts relative to different reference directions may have different magnitudes and thus should not be subjected to the same threshold.

At step 815, system 300 may make additional adjustments to the weight values for general smoothness correction. In some embodiments, a uniform weight value is added to each weight such that the smoothing algorithm creates a more generally-smooth final surface. This uniform adjustment can be made at the discretion of the use in application. In other embodiments, the adjusted weight values are calculated as the product of the weights from step 810 by the difference between one and the uniform offset, added to the uniform offset, e.g., (weight=(1.0−min weight)*weight+min weight). This allows that the final weighted values only exist between the normalized range of zero and one after the additional adjustment. In some embodiments of process 415, the functions performed at step 815 may be omitted.

In some embodiments, the final weighted values generated during step 815 are then stored in the weights buffer 340. The final weights will later be used by system 300 in step 430 of process 400 for smoothing by the modified smoothing algorithm. A general smoothing algorithm can be modified such that, a vertex with a weighted value of one is fully subject to being smoothed and thus adjusted by the smoothing algorithm, while a weighted value of zero will receive no adjustment from the smoothing algorithm. All values between zero and one can be proportionally adjusted based at least on their weighted value. For example, given a Laplacian smoothing filter, the Laplacian smoothing algorithm may be modified and applied to the surface mesh as follows:

$$v_{i,new} = v_i + (k * w_i)\frac{\sum_{j=1}^{M} u_j - v_i}{M}$$

where $v_i$ is the position of vertex i in the surface mesh, $v_{i,new}$ is the adjusted position of vertex i, k is a uniform smoothing constant, $w_i$ is the weighted value assigned to vertex i, $u_j$ is the position of a neighboring vertex/to vertex i (a vertex j is neighboring to vertex i if there exists an edge or face that connects that vertex to vertex i), and M is the number of neighboring vertices to vertex i.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method of smoothing a surface mesh, comprising:
   determining first angles between a first direction and vectors normal to a plurality of faces defined in the surface mesh;
   determining second angles between a second direction and vectors normal to the plurality of faces defined in the surface mesh;
   determining a set of artifact vertices by:
      including a first vertex of the surface mesh in the set of artifact vertices responsive to the first angles associated with faces adjacent to the first vertex satisfying a first condition; and
      including a second vertex of the surface mesh in the set of artifact vertices responsive to the second angles associated with faces adjacent to the second vertex satisfying a second condition;
   calculating a weighted value for a third vertex of the surface mesh based on a distance from the third vertex to a nearest artifact vertex in the set of artifact vertices; and
   generating a smoothed surface mesh by using the weighted value in a smoothing algorithm applied to the surface mesh.

2. The method of claim 1, wherein the first direction and the second direction are coordinate directions of a coordinate system in which the surface mesh is defined.

3. The method of claim 1, comprising generating the surface mesh from computed-tomography (CT) images, wherein the first direction is a stack direction of the CT images and the second direction is a coordinate direction in the CT images such that the first direction is normal to the second direction.

4. The method of claim 1, further comprising calculating third angles between a third direction and vectors normal to the plurality of faces defined in the surface mesh, wherein:
   the third direction is normal to the first direction and the second direction; and
   determining the set of artifact vertices further comprising including a fourth vertex of the surface mesh as an artifact vertex responsive to the third angles associated with faces adjacent to the fourth vertex satisfying a third condition.

5. The method of claim 1, wherein the first angles associated with the faces adjacent to the first vertex satisfy the first condition if one of the first angles differs from another of the first angles by more than a threshold amount.

6. The method of claim 1, wherein calculating the weighted value for the third vertex comprises:
   determining a maximum distance from an artifact vertex in the set of artifact vertices to a furthest vertex from the set of artifact vertices; and
   determining the weighted value as a function of the distance and the maximum distance.

7. The method of claim 6, wherein the function is configured such that the weighted value increases quadratically as a difference between the distance and the maximum distance increases.

8. The method of claim 6, further comprising reducing the weighted value if an output of the function of the distance and the maximum distance is less than a threshold value.

9. The method of claim 6, further comprising adding an offset to an output of the function of the distance and the maximum distance.

10. The method of claim 1, wherein the smoothing algorithm comprises a Laplacian smoothing filter.

11. The method of claim 1, further comprising:
    generating a control object based on the smoothed surface mesh; and
    controlling a robotic device using the control object.

12. The method of claim 11, wherein the smoothed surface mesh represents a bone and controlling the robotic device using the control object comprises causing the robotic device to guide or execute a resection of the bone.

13. The method of claim 11, wherein controlling the robotic device using the control object comprises providing haptic feedback via the robotic device based on an interaction between the control object and an interaction point associated with an end effector of the robotic device.

14. The method of claim 1, further comprising displaying the smoothed surface mesh on a graphical user interface.

15. The method of claim 1, wherein the first condition is the same as the second condition.

16. The method of claim 1, further comprising calculating additional weighted values for a plurality of additional vertices of the surface mesh based on distances between the additional weighted values and the set of artifact vertices;
wherein generating the smoothed surface mesh further comprises using the additional weighted values in the smoothing algorithm applied to the surface mesh.

17. A computer system programmed to:
calculating first angles between a first direction and vectors normal to a plurality of faces defined in a surface mesh;
calculating second angles between a second direction and vectors normal to the plurality of faces defined in the surface mesh;
determining a set of artifact vertices by:
including a first vertex of the surface mesh in the set of artifact vertices responsive to the first angles associated with faces adjacent to the first vertex satisfying a first condition; and
including a second vertex of the surface mesh in the set of artifact vertices responsive to the second angles associated with faces adjacent to the second vertex satisfying a second condition;
calculating a weighted value for a third vertex of the surface mesh based on a distance from the third vertex to a nearest artifact vertex in the set of artifact vertices; and
generating a smoothed surface mesh by using the weighted value in a smoothing algorithm applied to the surface mesh.

18. The computer system of claim 17, wherein the surface mesh is based on computed-tomography (CT) images, the first direction is a stack direction of the CT images, and the second direction is a coordinate direction in the CT images such that the first direction is normal to the second direction.

19. The computer system of claim 17, wherein the first angles associated with the faces adjacent to the first vertex satisfy the first condition if one of the first angles differs from another of the first angles by more than a threshold amount.

20. The computer system of claim 17, wherein calculating the weighted value for the third vertex comprises:
determining a maximum distance from an artifact vertex in the set of artifact vertices to a furthest vertex from the set of artifact vertices; and
determining the weighted value as a function of the distance and the maximum distance.

* * * * *